July 14, 1925.
W. E. TRENT
METHOD OF TREATING ORES
Filed July 10, 1919
1,545,619
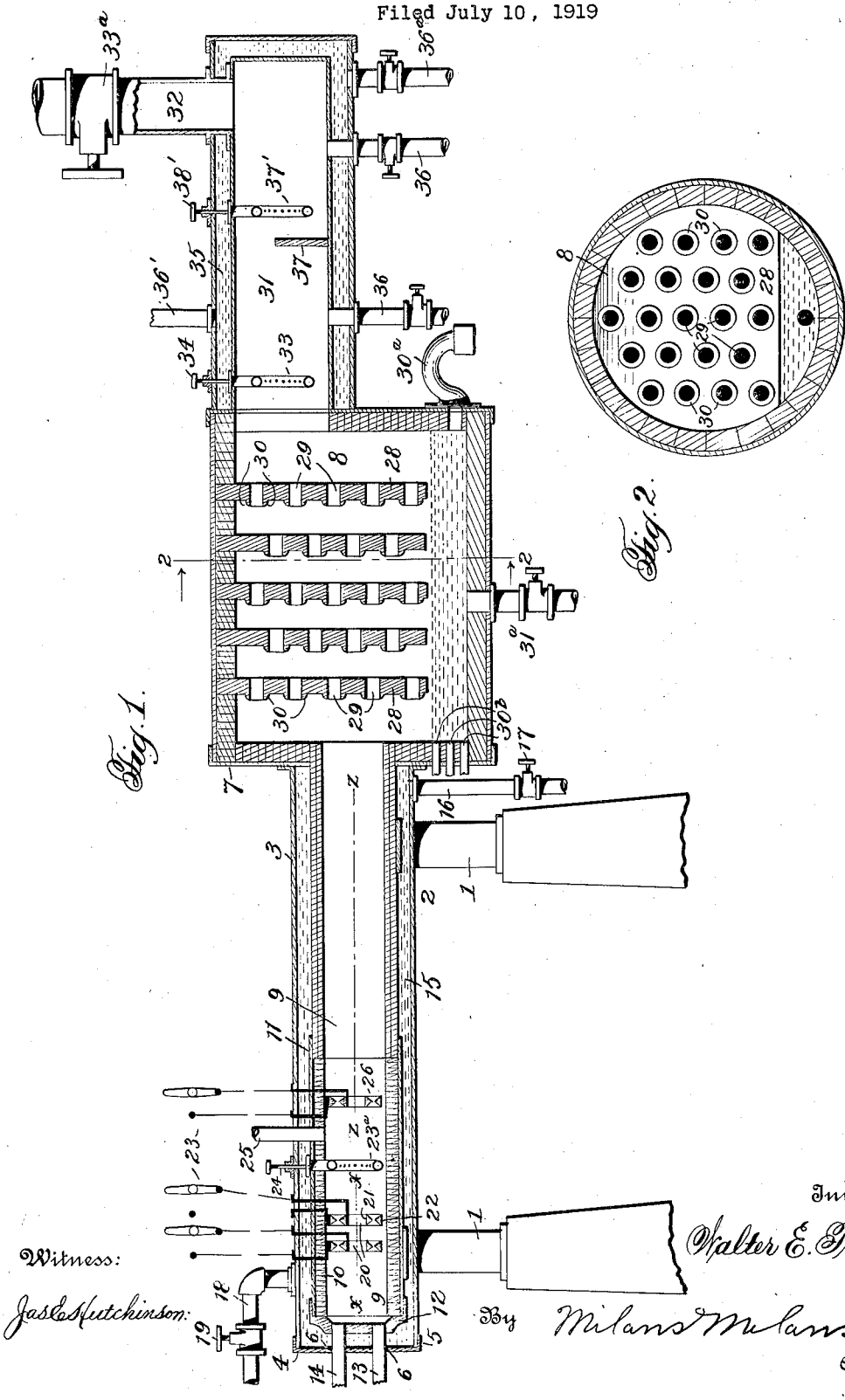
Witness:
Jas E Hutchinson
Inventor:
Walter E. Trent,
By Milans & Milans
Attorneys Patented July 14, 1925.

1,545,619

UNITED STATES PATENT OFFICE.

WALTER E. TRENT, OF WASHINGTON, DISTRICT OF COLUMBIA, ASSIGNOR, BY MESNE ASSIGNMENTS, TO TRENT PROCESS CORPORATION, OF WASHINGTON, DISTRICT OF COLUMBIA, A CORPORATION OF DELAWARE.

METHOD OF TREATING ORES.

Application filed July 10, 1919. Serial No. 309,909.

*To all whom it may concern:*

Be it known that I, WALTER E. TRENT, a citizen of the United States, residing at Washington, in the District of Columbia, have invented certain new and useful Improvements in Methods of Treating Ores, of which the following is a specification, reference being had therein to the accompanying drawing.

The invention relates to a method and apparatus for treating materials such as ores, chemicals, minerals or the like to change the condition or state thereof. The invention is of the general character disclosed in my copending application, Serial No. 306,647, and is applicable to oxidizing, reducing, melting, smelting, volatilizing, chloridizing, sulphating or sulphidizing processes or combinations of these.

In the treatment of ores, minerals and chemicals by heat processes or by chemical or metallurgical processes that involve heat treatments, if the materials can be brought into immediate contact with the heating and chemical agents the desired reactions will take place very rapidly, if the materials being treated are in a fine state of division. This method therefore involves the grinding or pulverizing of the materials to be treated into an impalpable form before they are subjected to the action of heat so that the desired treatment takes place with the greatest rapidity.

By grinding the material into such a fine state of division, the same is in such minute particles that the particles are practically all surface and no body, and therefore, subject to immediate heat reaction, and furthermore fine grinding results in a physical separation of different substances of a charge which may go to make up the material being treated.

The method also contemplates a combined heat and chemical treatment for ores, chemicals, minerals and gases for either performing a simple change of state, as from sulphides to oxides, oxides to metals, etc., or for such other changes as may be desired in substances which constitute, or have been made to constitute, a normally fusible or smelting mixture, in the treatment of which the reaction may be smelting, either with or without volatilizing desired products. While the process is primarily adapted for treating charges of a fusible or smelting nature, it comprehends also the treatment of charges and substances which are not, or have not been made normally fusible.

In the present method, the rapidly moving current passes through a zone of heat, of a regulated and variable temperature, and is intensely heated. It is into this current that the finely divided charge is introduced, being entrained and carried thereby so that each particle is surrounded by the heating current to bring about a reaction or change of condition of the charge, while travelling in suspension in the current through the heating zone. The temperature of the fluid passing through the treating zone is made variable by controlling the temperature of the heating zone through which the fluid travels, prior to the introduction of any materials or substances thereto for treatment, the variable temperature being necessary because substances of different character may require different degrees of heat to bring about the reaction, change of state, or volatilization, as may be desirable. The present method contemplates the provision of electric arcs, or other heat producing elements disposed within the path of travel of the rapidly moving current to intensely heat the same, it being understood that the heat produced by the arcs is under instant conrol at all times to enable the regulation of the fluid current temperature.

The invention further comprehends the introduction of any special chemical or other treating agent to the moving current prior to the introduction of the charge thereto, which treating agent may be desirable to cause physical or chemical changes of the charge during the heat treatment. Such an agent may be sodium chloride (or common salt) should a charge of material containing metals such as lead, silver or gold, be introduced for treatment, which agent, in this instance, would cause a choridizing of the materials, thus rendering them easy to volatilize or leach. It is to be understood that the nature of the agent introduced to the current, is, of course, dependent upon the kind of material to undergo treatment, and the nature of the reactions desired. In volatilizing materials, the temperature of the moving fluid current is raised to the proper degree, but this temperature is to be under such control as to either totally volatilize all contents that can be made volatile, to volatilize only some of the volatile component parts, or to bring about a change of state or condition in the material so that a solid or molten condition will have resulted after treatment.

The invention further contemplates what may be termed a dry collection of the charge, or the unvolatilized portion of the charge, from the traveling current or blast, in a solid or molten form after having undergone treatment. The ores or materials are carried in suspension by the current and after having undergone treatment, the method contemplates the separation of the gases from the molten particles by providing perforated baffles placed within the path of the blast, having the apertures of each succeeding baffle arranged so that the perforations or apertures are staggered in relation to the baffle preceding it.

As stated, the baffles are fixed in the furnace flue, directly within the path, or travel, of the current, commencing at the end of the section of the flue in which the material has undergone treatment, and the baffles with their staggered holes are so arranged, and are of sufficient numbers, so that neither gases nor materials can pass through all the holes without having had contact with the baffle surfaces.

The solid or molten particles entrained in the current, having been fluxed and blended to form a smelting mixture, are successively and continuously thrown against the collecting baffles while the fluid current and gases find their way through the staggered apertures and, after being robbed of their solid or molten particles, pass on to a point of controlled discharge. The solid or molten particles which may consist of slag forming materials, mattes and metals, come into contact with each other, form the fusion desired and the resulting molten liquids trickle down the baffles, running around the holes on account of the raised collars, into a settling chamber arranged to receive them where the molten materials may be allowed to settle and to be drawn off according to their specific gravities, or, where they may be drawn off continuously to an outside settling chamber for separation.

When the charge is not blended for slag forming or smelting, and part of the same is in a solid state after treatment, the solid particles of the charge are stopped by the baffles and removed from the current, falling by gravity down the sides of the baffles into the receiver below, from which they can be removed through a bottom discharge opening when desirable.

If only some substances are volatilized and others are in a molten or solid state after being subjected to heat while traveling in the fluid current, these solid or molten particles are collected from the gases and should a further treatment thereof be desirable, they may again be introduced to the fluid current and a process of selective treatment can be employed, in which case each substance is volatilized, condensed and collected at its own individual temperature and under its individual conditions.

It is to be understood that the gases which contain volatilized substances which are to be recovered, will pass from the section containing the baffles into a condensing chamber, or chambers, in which they will be subjected to any of the condensing methods now in use, whether they depend upon cooling, chemical, or electric treatment, or all of them. This process deals with the treatment of the substances, sending all of the products to be saved into the gases, or sending all of the products to be saved into the collecting chamber in molten form, or sending part of the products into gases and part into molten form, and then stops with the separation of the gases from the solid and molten and condensed materials, leaving any further treatments if desired to existing, well known processes.

For the treatment of ores, chemicals, gases, or other materials of an oxidized nature, the method contemplates, controlling the nature of the treating fluid so that it will have a reducing reaction, for instance by having present excess carbon or carbon monoxide, or for the treatment of any materials of a sulphide nature, to control the characteristics of the treating gases so that excess oxygen will be present to desulphurize such materials, it being the object of this method to treat all materials as outlined in my copending application whether they require either a heat treatment alone, or a combined heat and chemical treatment by introducing into the fluid the necessary oxygen, carbon, chemicals or other treating substances that may be necessary to bring about the desired reactions, but to separate the gases and solids while in their volatilized and molten conditions instead of, as in my first method, collecting and separating same by the action of a cooling and emulsifying fluid.

In the accompanying drawings, in Figure 1 I have shown a side elevation of an apparatus with parts in section for carrying out the present method, and Fig. 2 a sectional view on line 2—2 of Fig. 1.

Referring now more particularly to the drawings, wherein like reference characters indicate corresponding parts, the numeral 1 designates suitable supporting elements being disclosed as posts or the like upon which the apparatus 2 is mounted, this form of support being a convenient one, but obviously, other means for supporting the apparatus may be employed. The apparatus consists of a metallic casing 3, having a removable end portion 4 provided with a flange 5, the end portion having suitable apertures 6 passing therethrough for the reception of conveying pipes, the purpose of which will later appear. The opposite end of the casing lies against and is secured to a right angle collar 7 forming the end wall of what may be termed a dry collecting chamber 8 into which treating products are conveyed in a manner which will later appear.

Disposed within the casing 3 and spaced therefrom is a longitudinal chamber 9, having a lining 10 of tile, fire clay, brick or the like, which is surrounded by an exterior metallic covering 11. At one end, this chamber is formed with a closure plate 12 fitted over the same and receiving the fluid in the pipe 13 and treating pipe 14 which pass through the aperture 6 in the cap plate 4 as well as suitable apertures in the closure plate 12. The opposite end of the chamber is open ended, and enters the dry collecting chamber 8. The chamber 9 is spaced from the shell 3 throughout its length, and the space therebetween constitutes a water reservoir 15, serving as a cooling medium, the fluid entering the reservoir through the feed pipe 16 under control by the valve 17, and after passing therethrough is conveyed from the reservoir through an outlet pipe 18 controlled by the globe valve 19.

The interior of the chamber 9 is divided into what constitutes a heating and a treating zone, the heating zone being indicated by the reference characters XX, while the treating zone is indicated by the reference characters ZZ. Air is admitted to the heating zone through the pipe 13 under pressure and velocity so as to travel rapidly therethrough, the volume and pressure of the air being of course dependent upon the condition and size of the apparatus. To heat this air upon its arrival to the chamber there is disposed within the heating zone a plurality of separated electric arcs 20 consisting of inner and outer circular electrodes 21 and 22 connected with the electric terminals 22', the terminals of each arc being separately controlled by the controlling switches 23. While this form of electric arc is preferred, and is one from which favorable results can be secured, it is manifest that the conventional type of arc consisting of the separated electrodes now generally used, can be employed if found desirable.

Two of the electric arcs are shown as being disposed within the heating zone, but obviously any number may be employed to the end that the moving air current be intensely heated, the arcs being disposed within the path of travel of the air current. By providing separate switches for the different arcs the temperature of the heating chamber is made variable and regulatable so that the incoming air is heated to the desired and controlled temperature, but to provide additional means for regulating the temperature of the traveling air, a spray $23^a$ enters the heating chamber, leading from the water reservoir 15 and controlled by the manually operated needle valve 24. It is apparent that should water be admitted to the heating zone, the rapidly moving air current will of course be cooled as the temperature of the heating zone will be lowered by the introduction of the water.

Leading to the chamber 9 adjacent the entrance of the treating zone indicated by the characters ZZ, is a charge conveying pipe 25, through which ore or other material in such a fine state of division is to be carried in suspension when the rapidly moving air current is introduced. The ore introduced to the current is first ground to an impalpable mass to put the material into such minute particles that they are practically all surface and no body, and therefore subject to immediate heat reaction, separating the different substances composing the component to be treated. To deliver this charge to the air current a suitable liquid, such as water, may be mixed with the charge and fed directly to the heated current after its passage past the electrical heating arcs. Water is not introduced with the ore if the temperature of the current is to be of such a high degree as to volatilize substances and may also not be introduced with the charge of ore or the like, if the treatment of such ore does not require the presence of a fluid. The charge introduced to the rapidly moving air current is usually fluxed or blended to form a smelting mixture, although this is not necessary, the present method contemplating the introduction of a charge that is not blended for slag forming or smelting if desirable, in either event the charge, however, being in a finely divided state, and when introduced to the heated air current is suspended therein, and is subjected to heat while traveling through the treatment zone entrained in the moving current. To generate additional heat in the treating zone an electric arc 26 is disposed therein, this serving when in operation to raise the temperature or to permit a high temperature of the treating fluid carrying the ore should such a temperature be desirable to insure a further treatment of the charge under varying conditions. It will be understood that this arc is only in circuit when such a high temperature is desired, and can be thrown out of circuit at any time.

In the treatment of many ores, the use of a chemical or other treating agent is desirable, and in carrying out the present method should an agent such as sodium chloride or salt be needed to cause metals such as gold, silver and lead to become chloridized, thus rendering them easy to volatilize and leach, this agent is introduced through the treatment pipe 14 directly to the rapidly moving air current prior to the entry of the charge thereto. It will be understood that the character of the agent introduced to the blast is of course dependent upon the kind of ore and material undergoing treatment, it being sufficient to say that any chemical or other agent needed to bring about a proper treatment of the charge may be introduced to the current as is desirable.

The charge, which consists of very minute particles is as before stated, carried in suspension in the heated air current through the treating zone to be treated, and after traveling through this zone the treated charge is delivered to the collecting chamber 8, and assuming that a charge of ore or the like after treatment is in a solid or molten condition and entrained in the air current, the solid or molten particles encounter a series of baffles 28 disposed within the dry collecting chamber, each baffle having a series of apertures 29 therein arranged staggeredly with relation to the apertures of the preceding and succeeding baffle. The solid or molten particles of course strike these baffles, their movement being arrested and these particles are then robbed or taken from the air current, and if in a molten form flow down the sides of the different baffle or collecting plates 29 around the outstanding collars 30 surrounding each aperture and into the receiving reservoir or chamber 30'. The apertures in the baffles permit the gases to escape, and these apertures are so arranged and the baffles of such a number that neither gases nor materials can pass through the holes or apertures therein without first having had contact with the baffle surfaces, it being understood, however, that the moving air current after being robbed of its solid or molten particles passes through the apertures to a point of controlled discharge. The solid or molten particles may consist of slag forming materials, mattes and metals, collect into the settling or collecting reservoir where the molten materials may be allowed to settle and be drawn off according to their specific gravities through the vertically disposed outlet pipes 30$^b$, or the entire mass may be continuously drawn off without settling for separation through pipe 30$^a$. In following this method, the charge is usually blended for slag forming or smelting, but if the particles of the charge after being treated are in a solid formation, they are of course stopped by the baffles and dropped into the collecting reservoir from where they are withdrawn through the valve controlled discharge 31$^a$.

The moving air current after passing through the collecting chamber 9 and robbed of all solid and molten particles, pass on to the condensing chamber 31 and are permitted to be discharged through a stack 32 controlled by the valve 33$^a$.

If a charge is to be totally volatilized, this is accomplished by raising the temperature of the moving air current to such a degree as to volatilize the charge while travelling in suspension in the current through the treatment zone, the vapors of the charge after passing through the apertures 29 in the baffles disposed within the dry collecting chamber 8 enter the condensing chamber 31. Upon arriving at the condensing chamber a fluid may be introduced to the moving air current and the vapors through the spray 33 controlled by the valve 34 leading from the water jacket 35 surrounding and serving to cool the condensing chamber, water being conveyed to the jacket through the water feed pipe 36' while water is carried from the jacket through the valve controlled discharge pipe 36$^a$. The condensing chamber has preferably disposed therein a baffle 37 serving to trap and collect the condensates first formed in the condensing chamber. On the other side of the baffle there is another water spray 37' controlled by the valve 38' serving to condense any vapors passing beyond the baffle, which vapors when condensed drop into the lower portion of the condensing chamber and are removed therefrom through the valve controlled outlets 36 while the air current is permited to escape through the stack 32. I have disclosed a means of collecting the volatilized charge in the nature of a condenser in which the condensates of vapors first formed accumulate on one side of the baffle 37, while other vapors in the air current which have not condensated receive an additional injection of fluid after passing the baffle 37 to bring about a condensation thereof, which vapors are collected on the other side of said baffle.

It is an object of this method to treat complex ores or materials in which a number of different substances are encountered in a charge, some of which will volatilize at lower temperatures, while others require a comparatively higher temperature to bring about a volatilization thereof. A complex charge of this character may be treated so as to volatilize one or more of the materials that are easily converted into vapors by the introduction of the charge to the heated air current at a controlled degree, while other materials of the charge are only put in a solid or molten condition, in this event the solid or molten particles being collected in the dry collecting chamber 8 while the volatilized substance is condensed and collected in the condensing chamber 31. If a selective treatment such as this is employed, those products which volatilize at the lowest temperatures may be separated from the charge in one operation, and then the materials which are collected either in solid or molten form can be cooled and pulverized and put through another furnace treatment by themselves, to volatilize materials which require higher temperatures to bring about a volatilizing thereof, the vapors being then collected and condensed.

Having thus described the invention, what I claim is:

1. An apparatus of the character described, comprising a chamber for receiving a heated treating fluid, of means for introducing ore or the like in a fine state of division to the fluid to be carried therein and to undergo treatment while suspended, and means for collecting the material in a dry or molten condition from the fluid after treatment, said means comprising baffles having staggeredly arranged openings therein disposed within the path of travel of the fluid the surfaces of the baffle stopping the movement of the solid and molten particles to be deposited into a receiver, and in allowing the fluid to escape through the openings in the baffles.

2. An apparatus of the character described, comprising a chamber for receiving a heated treating fluid, of means for introducing ore or the like in a fine state of division to the fluid to be carried therein and to undergo treatment while suspended, and means for collecting the material in a dry or molten condition from the fluid after treatment, said means comprising baffles disposed within the path of travel of the fluid for stopping the movement of the solid and molten particles to be deposited into a receiver, and in allowing the fluid to escape, said baffles having staggeredly arranged openings therein, and collars surrounding said openings to compel the solid and molten materials when removed from the fluid to pass around the openings.

3. An apparatus for treating materials, such as ores and the like, to change the state thereof, comprising a treatment chamber, of a plurality of electrical heating units disposed within said chamber, and means for separably controlling said units, of means for introducing a fluid current to the chamber to be heated by said units, means for conveying comminuted ore to the current to be entrained and treated while in suspension therein, and means for collecting the treated ore from the current.

4. An apparatus for treating materials, such as ores and the like, to change the state thereof, comprising a treatment chamber of a plurality of electrical heating units disposed within said chamber, and means for separably controlling said units, of means for introducing a fluid current to the chamber to be heated by said units, means for conveying comminuted ore to the current to be entrained and treated while in suspension therein, and means for collecting the treated ore from the current, said last mentioned means embracing a plurality of separated collecting baffles having staggeredly arranged openings therein to permit the current to escape after being robbed of the material carried thereby.

5. An apparatus for treating materials, such as ore and the like, comprising a treatment chamber having a plurality of separated heating units therein, means for introducing a fluid current to said chamber to be heated by said units, means for controlling said units to regulate the temperature of the current, means for introducing ore to the current to be entrained and carried in suspension therein while undergoing treatment, and means for recovering the ore from said current.

6. The process of treating ores and like materials, which consists in introducing material in a comminuted state to a moving heating current to undergo treatment therein, in disposing in the path of travel of said current an abutment to cause molten particles to be removed from the current and combine, forming slag, and in then collecting the slag.

7. In an apparatus for treating materials such as ores and the like, the combination with a heating chamber, of electric heating means therein for applying heat to the ore, of means for introducing a fluid current to said chamber to receive finely divided ore to carry the same in suspension therethrough, means for separating solid and molten material from vaporized substances in said fluid current comprising a separating chamber, a receiver in said chamber for the solid and molten material, and a discharge for said volatiles disposed beyond said separating chamber.

8. In an apparatus for treating materials such as ores and the like, the combination with a heating chamber, of electric heating means therein for appying heat to the ore, of means for introducing a fluid current to said chamber to receive finely divided ore to carry the same in suspension therethrough, means for separating solid and molten material from vaporized substances in said fluid current comprising a separating chamber, a receiver in said chamber for the solid and molten material, and a discharge for said volatiles disposed beyond said separating chamber, said separating chamber having provided therein a plurality of baffles and staggeredly arranged openings in said baffles.

In testimony whereof I hereunto affix my signature in the presence of two witnesses.

WALTER E. TRENT.

Witnesses:
CHARLES M. THOMAS,
JAMES L. CRAWFORD.